US009096308B2

(12) United States Patent
Edmond et al.

(10) Patent No.: US 9,096,308 B2
(45) Date of Patent: Aug. 4, 2015

(54) WINGTIP FIN OF AN AIRCRAFT

(71) Applicant: AIRBUS OPERATIONS LIMITED, Bristol (GB)

(72) Inventors: George Edmond, North Somerset (GB); Robert L. J. Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 228 days.

(21) Appl. No.: 13/755,314

(22) Filed: Jan. 31, 2013

(65) Prior Publication Data

US 2013/0193273 A1   Aug. 1, 2013

(30) Foreign Application Priority Data

Jan. 31, 2012   (GB) .................................. 1201609.3

(51) Int. Cl.
  *B64C 23/06*   (2006.01)
  *B64C 3/58*    (2006.01)
  *H05K 5/00*    (2006.01)
  *G09F 21/10*   (2006.01)

(52) U.S. Cl.
  CPC ............... *B64C 3/58* (2013.01); *B64C 23/065* (2013.01); *G09F 21/10* (2013.01); *H05K 5/0017* (2013.01); *Y02T 50/164* (2013.01)

(58) Field of Classification Search
  USPC ................... 244/199.4, 199.1, 199.2
  See application file for complete search history.

(56) References Cited

U.S. PATENT DOCUMENTS

| 2,617,220 | A | | 11/1952 | McCarthy et al. |
| 5,348,253 | A | * | 9/1994 | Gratzer ........................... 244/91 |
| 5,407,153 | A | * | 4/1995 | Kirk et al. ................. 244/199.4 |
| 5,703,314 | A | | 12/1997 | Meeker |
| 5,709,454 | A | * | 1/1998 | Hatlestad, II ................. 362/496 |
| 6,484,968 | B2 | * | 11/2002 | Felker .............................. 244/91 |
| 7,175,321 | B1 | * | 2/2007 | Lopez ........................... 362/496 |
| 8,136,766 | B2 | * | 3/2012 | Dennis ....................... 244/199.4 |

FOREIGN PATENT DOCUMENTS

NL      7701435 A     8/1978

OTHER PUBLICATIONS

Search Report corresponding to GB 1201609.3 dated May 28, 2012.
Wikipedia, "Wingtip device", http://en.wikipedia.org/wiki/Wing_tip_device, accessed online May 26, 2012. See section 2.2.3.3 (advertising) and figures disclosing advertising on wing tip device. Archived http://web.archive.org/web/20070928070255/http://en.wikipedia.org/wiki/Wingtip_device.

* cited by examiner

Primary Examiner — Brian M O'Hara
Assistant Examiner — Keith L Dixon
(74) Attorney, Agent, or Firm — Lowe Hauptman & Ham, LLP

(57) ABSTRACT

A wingtip fin of an aircraft comprising an upstanding fin body, the fin body having an inboard face and an outboard face and a recess defined therewithin, a display screen assembly in the recess in the fin body, the display screen assembly comprising a translucent face, substantially flush with and forming at least part of the inboard face or the outboard face of the fin body, and a display screen arranged in the recess such that images displayed on the display screen are visible through the translucent face.

14 Claims, 2 Drawing Sheets

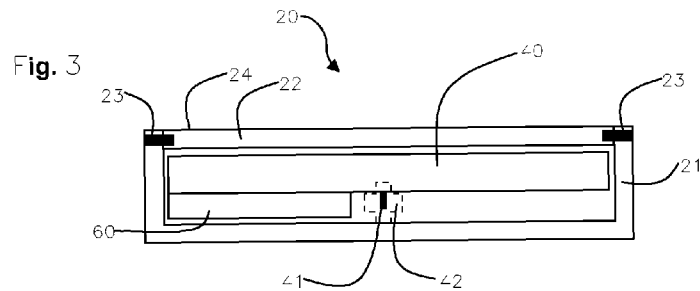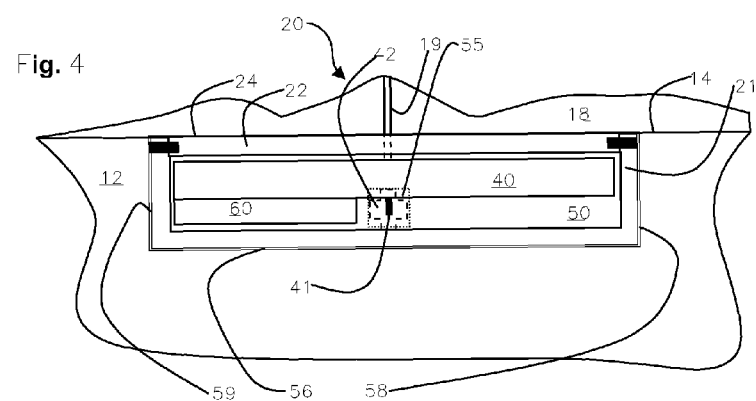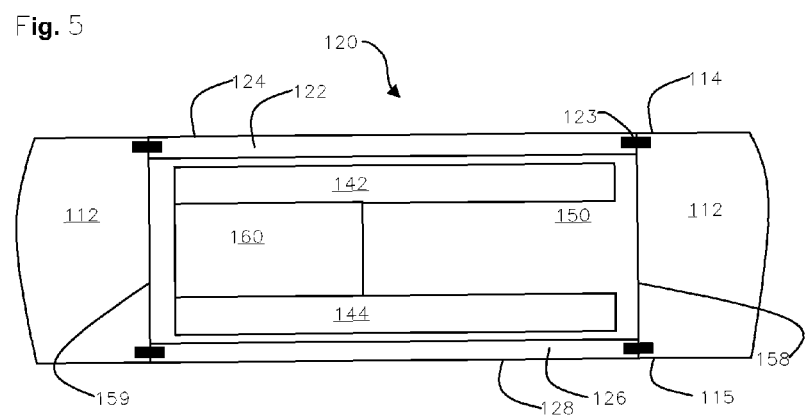

WINGTIP FIN OF AN AIRCRAFT

RELATED APPLICATIONS

The present application is based on, and claims priority from, British Application Number 1201609.3, filed Jan. 31, 2012, the disclosure of which is hereby incorporated by reference herein in its entirety.

The present invention relates to a wingtip fin of an aircraft particularly, although not exclusively limited to, a commercial passenger aircraft. The invention also relates to an exterior visual display configured for use in a wingtip fin.

Various commercial passenger aircraft include upstanding fins at their wingtips. Such fins are included because it is believed that they reduce the wingtip vortex produced by the passage of such aircraft through the air. Commercial airlines have taken to using that surface to include, typically, corporate livery. Typically, that livery is applied by various means onto the surface of the fin, for example by the application of a decal. During low light or night conditions a dedicated remote light source illuminates the face of the fin which faces the fuselage to enable the livery to be viewed by passengers onboard the aircraft and by persons on the ground after the aircraft has landed. Further to this, given the prevalence for code sharing agreements between airlines, particularly those airlines in similar airline alliances, the ability to display more than one livery on an aircraft would appeal.

It is object of the invention to provide an improved wingtip fin for an aircraft, particularly to provide an exterior visual display on one or both of the inner and outer faces of the wingtip.

According to a first aspect of the invention, there is provided a wingtip fin of an aircraft comprising an upstanding fin body extending from the tip of a wing, the fin body having an inboard face and an outboard face and a recess defined therewithin, a display screen assembly in the recess in the fin body, the display screen assembly comprising a translucent face, which face is substantially flush with and forms at least part of the inboard face or the outboard face of the fin body, and a display screen arranged in the recess such that images displayed on the display screen are visible through the translucent face.

A display screen includes any self-illuminating visual display unit including, non-exhaustively, a CRT, an LCD, a plasma screen, an LED matrix, which is able to display different images on demand.

By providing a display screen, the display may comprise various and changing elements. By housing the display screen within the display screen assembly inside the wingtip and protected by the translucent face, sufficient operational environment protection is provided.

A heat sink may be provided within the fin body to assist dissipation of heat from the display screen.

The translucent face is preferably mounted to the rest of the display screen assembly either by a mechanical fastener or a clip, an adhesive or integral moulding.

The display screen preferably comprises a Liquid Crystal Display (LCD), although plasma displays, Light Emitting Diode (LED) displays and Vacuum Fluorescent (VF) displays may also be used. The display screen preferably transmits low intensity light to reduce light pollution.

An electronic controller may also be included in the display screen assembly, with data storage capability and a wireless interface. This allows for adaptable data to be transmitted via the display screen and allows the display to be re-programmable in flight.

The wingtip fin may be of modular design, having an umbilical cord electrical connection to facilitate external access, removal and replacement of the wingtip fin.

The display screen assembly may include an umbilical cord electrical connection to facilitate external access, removal and/or replacement of the display screen assembly. Alternatively, a bayonet contact, spring loaded contact or touch contact electrical connection may be provided. An additional power cable may be provided for use as a backup or to provide additional lighting positioned independently from the display screen in the wingtip fin.

The display screen assembly preferably comprises a self-contained module comprising the translucent face and the display screen. Such a module may be arranged replaceably in the wingtip fin.

The display screen assembly may comprise a translucent face on one side and a translucent face on the other, opposite side with two, back to back display screens arranged between the translucent faces. In that way, a display screen is provided on both inboard and outboard faces of the wingtip fin body. The two back to back display screens may be provided with an electronic controller each, so that they may be operated independently.

According to another aspect of the invention there is provided a display screen assembly configured to be received within a recess in a wingtip fin of an aircraft, the display screen assembly comprising a housing, the housing containing a display screen, the display screen being covered by a wall of the housing, the wall of the housing being translucent and the housing including an electrical power input connector for connection to an aircraft electrical power cable for powering the display screen.

FIG. 2a is a view looking aft from the front of an aircraft wing and FIG. 2b is a view looking outboard along an aircraft wing.

FIG. 3 is a schematic sectional view of a display screen assembly for the wingtip of FIG. 1.

FIG. 4 shows a section view III-III of the wingtip of FIG. 1 in accordance with a first embodiment of the present invention.

FIG. 5 shows a section view III-III of the wingtip of FIG. 1 in accordance with a second embodiment of the present invention.

Figure 1:
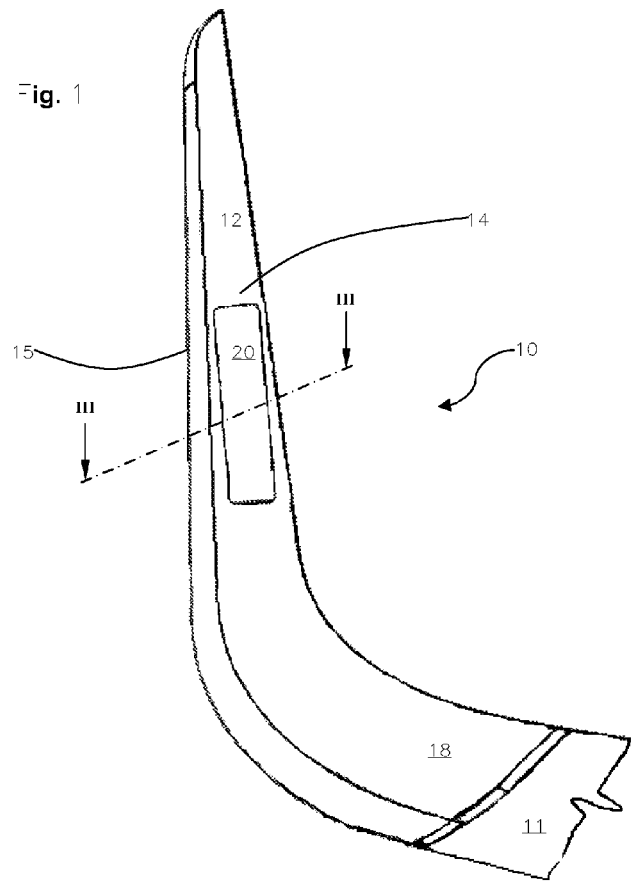
FIG. 1 shows a perspective view of a wingtip fin of an aircraft.

A wingtip fin 10 of an aircraft (see FIG. 1) has an aerodynamic form and approximates an L-shape, with a horizontal portion and a vertical portion. The vertical portion comprises an upstanding fin body 12 and the horizontal portion comprises an attachment region 18, which attaches to the outboard end of a wing 11. The upstanding fin body 12 further comprises an inboard face 14 and an outboard face 15.

Aligned vertically and horizontally to the approximate centre of the upstanding fin body 12 is a display screen assembly 20.

Figure 2A:
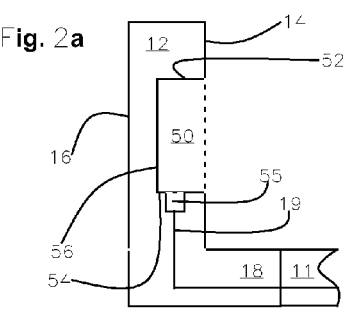
FIGS. 2a and 2b show the wingtip fin of FIG. 1 in schematic form.
Figure 2B:
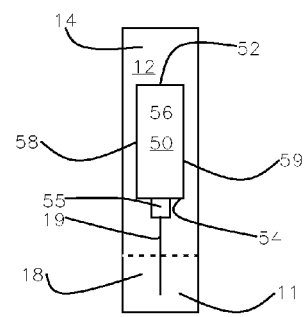

FIGS. 2a and 2b show the wingtip fin 10 and the wing 11 of FIG. 1 in a simplified view not featuring the display screen assembly 20.

The upstanding fin body 12 features five internal walls, three of which can be seen in FIG. 2a, namely spaced apart parallel upper and lower walls 52 and 54, and outboard wall 56. The other two internal walls can be seen in FIG. 2b, namely spaced apart parallel fore and aft walls 58 and 59. These five internal walls bound a recess 50 in the upstanding fin body 12. The recess 50 is configured to receive the display screen assembly 20 as described in more detail below. The lower wall 54 features a socket 55 connected to a power cable 19, which runs from the socket 55, down through the upstanding fin body 12, across the attachment region 18 and into the wing 11.

The display screen assembly 20 in FIG. 3 comprises a housing 21, in the form of a rectangular case open at one face. A translucent face 22 covers the open face of the housing 21 and is mounted to the housing 21 by screws 23, allowing removal and replacement of the face 22. The translucent face 22 has an outward surface 24.

A Liquid Crystal Display (LCD) screen 40 is mounted within the housing 21 and is arranged to display images visible through the translucent face 22. The LCD screen 40 is connected to an electrical power supply line 41 within the housing 21 which, in turn, is connected to a power input connector 42 on the exterior of the housing 21 through lower wall 54. The power input connector 42 is a bayonet-type connector, ensuring a secure electrical connection with an electrical power cable from the aircraft (not shown). The LCD screen 40 is further connected to an electronic controller 60.

FIG. 4 is a section through the upstanding fin body 12 of the wingtip fin 10 of FIG. 1, looking downwardly from above the wingtip. The section is taken approximately at line III-III in FIG. 1. The upstanding fin body 12 has recess 50, bounded by internal walls 52, 54, 56, 58 and 59 as described above. The display screen assembly 20 and electronic controller 60 are arranged within the recess 50 and are retained on five sides by the internal walls 52, 54, 56, 58 and 59 of the upstanding fin body, and on the sixth by the translucent face 22. The outward facing surface 24 of the translucent face 22 is arranged to sit flush with the inboard surface 14 of the upstanding fin body 12 to preserve the aerodynamic performance of the wingtip. The power input connector 42, is arranged to mate with the socket 55 so that electrical power can be delivered from the cable 19 in the aircraft wing 11, to the display screen assembly 20.

FIG. 5 shows a second embodiment in accordance with the present invention, which is substantially similar to that shown in FIG. 4 Similar features have been assigned the same numbers, prefixed by "1" to identify those features comprising the second embodiment.

FIG. 5 is a section through the upstanding fin body 12 of the wingtip fin 10 of FIG. 1, looking downwardly from above the wingtip. The section is taken approximately at line III-III in FIG. 1 in a similar fashion to FIG. 4. However, in this embodiment the upstanding fin body 112 has four internal walls, an upper internal wall (not shown), a lower internal wall (not shown), a fore internal wall 158 and an aft internal wall 159. These four internal walls bound a recess 150 in the upstanding fin body 112 which runs for its entire depth (i.e. inboard to outboard).

Two translucent faces 122, 126 bound the recess 150. Translucent face 122 is arranged such that the external surface 124 of translucent face 122 is flush with the inboard face 114 of the upstanding fin body 112 and translucent face 126 is arranged such that the external surface 128 of translucent face 126 is flush with the outboard face 115 of the upstanding fin body. The translucent faces 122, 126 are mounted directly to the upstanding fin body 112 by screws 123, allowing removal and replacement of the faces 122, 126.

Two LCD screens 142, 144 are mounted within the recess 150 and are arranged back to back, such that a first LCD screen 142 is visible through the inboard translucent face 122 and a second LCD screen 142 is visible through the outboard translucent face 126. The power connection arrangement is not shown, but is similar to that of the first embodiment. The electronic controller 160 is arranged in the recess 150 between the two display screens 142, 144.

Although in the drawings, the recesses and display screen assemblies are drawn with straight lines and symmetrical layouts, it should be obvious to those skilled in the art that the arrangements within a wingtip fin may involve complex curvatures and tapering sections. Also, although the drawings and their description have detailed the arrangement for a right-hand wing, it will be appreciated that the present invention is equally suited to a left-hand wing also. The bayonet power connection can be replaced by a spring loaded contact or any other suitable power connection.

In all of the embodiments, the level of light intensity and the colour of light, is controlled by a control unit which may be on board the display screen assembly, in the wing or on the fuselage. The controller may pass signals to the display screen assembly wirelessly.

Display of images on the display screen includes display of messages, flight, aircraft or airline information, words, logos and even block colour.

The invention claimed is:

1. A wingtip fin of an aircraft comprising an upstanding fin body, the fin body having an inboard face and an outboard face and a recess defined within the fin body, a display screen assembly in the recess in the fin body, the display screen assembly comprising a translucent face, substantially flush with and forming at least part of the inboard face or the outboard face of the fin body, and a display screen arranged in the recess such that images displayed on the display screen are visible through the translucent face.

2. The wingtip fin of claim 1, further comprising a heat sink.

3. The wingtip fin of claim 1, in which the translucent face is mounted to the display screen assembly by a mechanical fastener.

4. The wingtip fin of claim 1, in which the translucent face is mounted to the display screen assembly by an adhesive.

5. The wingtip fin of claim 1, in which the translucent face is mounted to the display screen assembly by an integral moulding.

6. The wingtip fin of claim 1 in which the display screen comprises a Liquid Crystal Display (LCD).

7. The wingtip fin of claim 1 in which the display screen assembly further comprises an electronic controller with data storage capability.

8. The wingtip fin of claim 7 in which the electronic controller further comprises a wireless interface.

9. The wingtip fin of claim 1, in which the wingtip fin is of modular design, having an umbilical cord electrical connection to facilitate external access, removal and replacement of the wingtip fin.

10. The wingtip fin of claim 1, in which the display screen assembly is of modular design, having an umbilical cord electrical connection to facilitate external access, removal and replacement of the display screen assembly.

11. The wingtip fin of claim 1, in which an additional power cord is provided.

12. The wingtip fin of claim 1, in which the display screen assembly comprises a translucent face on one side and a translucent face on the other, opposite face, with two, back to back display screens arranged between the translucent faces.

13. The wingtip fin of claim 12, in which the two display screens are operated independently.

14. A display screen assembly received within a recess in a wingtip fin of an aircraft, the display screen assembly comprising a housing, the housing containing a display screen, the display screen being covered by a wall of the housing, the wall of the housing being translucent and the housing including an electrical power input connector for connection to an aircraft electrical power cable for powering the display screen.

\* \* \* \* \*